United States Patent
Lang et al.

(12) United States Patent (10) Patent No.: US 7,154,381 B2
(45) Date of Patent: Dec. 26, 2006

(54) SYSTEM AND METHOD FOR OPERATING A SENSED POWER DEVICE OVER DATA WIRING

(75) Inventors: Jonathan P. Lang, Santa Barbara, CA (US); David L. Oster, Santa Barbara, CA (US)

(73) Assignee: Sonos, Inc., Santa Barbara, CA (US)

(*) Notice: Subject to any disclaimer, the term of this patent is extended or adjusted under 35 U.S.C. 154(b) by 252 days.

(21) Appl. No.: 10/852,938

(22) Filed: May 24, 2004

(65) Prior Publication Data

US 2005/0044431 A1 Feb. 24, 2005

Related U.S. Application Data

(60) Provisional application No. 60/473,023, filed on May 23, 2003.

(51) Int. Cl.
*G05B 11/01* (2006.01)

(52) U.S. Cl. ............ 340/310.01; 340/538; 340/538.11; 340/538.15; 340/310.12; 340/310.16; 340/310.17

(58) Field of Classification Search ................ 340/538, 340/538.11, 538.15, 538.16, 310.11, 310.12, 340/310.16, 310.17
See application file for complete search history.

(56) References Cited

U.S. PATENT DOCUMENTS

| | | | |
|---|---|---|---|
| 5,949,776 A | | 9/1999 | Mahany et al. |
| 6,154,488 A | * | 11/2000 | Hunt .......................... 375/219 |
| 6,295,356 B1 | * | 9/2001 | De Nicolo .................. 379/413 |
| 6,359,872 B1 | | 3/2002 | Mahany et al. |
| 6,804,351 B1 | * | 10/2004 | Karam ....................... 379/413 |
| 6,975,211 B1 | * | 12/2005 | Atsuta et al. ........... 340/310.16 |

* cited by examiner

*Primary Examiner*—Daryl C Pope
(74) *Attorney, Agent, or Firm*—Carr & Ferrell LLP (57) ABSTRACT

According to the present invention, a power source delivers power to a networked device over network cabling (e.g., Ethernet cabling) in one of two modes: a low power mode and a high power mode. The power source begins delivering power at a low power level in the low power mode, and switches to a high power level in the high power mode after a communication exchange between the networked device and the power source. A power source delivery system includes circuitry on both the power source and the powered device for communicating information between the devices.

38 Claims, 8 Drawing Sheets

SYSTEM AND METHOD FOR OPERATING A SENSED POWER DEVICE OVER DATA WIRING

CROSS-REFERENCE TO RELATED APPLICATIONS

This application claims the benefit of U.S. Provisional Patent Application Ser. No. 60/473,023, filed May 23, 2003, entitled "System and Method for Operating a Sensed Power Device over Data Wiring," which is incorporated herein by reference.

BACKGROUND OF THE INVENTION

1. Field of the Invention

The present invention generally relates to providing power to one or more networked devices via network cabling. More particularly, the present invention relates to providing power to one or more networked devices in one of at least two modes: a low power mode and a high power mode.

2. Description of the Background Art

Recently, there has been considerable effort to develop mechanisms to deliver DC power over the same cable used for Ethernet data transmission. As part of this "Power over Ethernet" (POE) effort, the industry has focused on low power applications that require less than 13 watts of DC power, operate within the safe electrical low voltage (SELV) region, and are powered using a single Class 2 power supply. Among other National Electric Code requirements, a Class 2 circuit includes a power-limited supply having a rating of less than 100VA, for dry indoor use in non-hazardous locations.

As part of the industry effort to develop POE, an IEEE 802 Working Group, IEEE802.3af is developing a specification for delivering POE for low power applications. The specification defines the functional and electrical characteristics for two devices: a power source and a powered device. The power supplied is 48 volts nominal, 13 watts, and is delivered using two of four twisted-wire pairs of a twisted pair cable (e.g., a Category 5 or Category 6 cable).

The current POE work falls short of meeting requirements that make it applicable to a wider range of applications. Specifically, the power specification of 13 watts is far too restrictive. On one hand, devices that need less than 13 watts will need to be powered by a power source that can deliver 13 watts (instead of a power source that can be designed to deliver less power). On the other hand, a powered device that needs more than 13 watts cannot be powered by existing POE solutions.

SUMMARY OF THE INVENTION

The invention provides a power delivery system for transmission of both power and data to a powered device over a networking cable. A power source combines power and data, and transmits data and at least two power modes to the powered device. The powered device separates the received power and data. The power source transmits data and power in a low power mode (i.e., a low power level) and a high power mode (i.e., a high power level).

A method for communication between the power source and the powered device includes the power source detecting whether the powered device capable of receiving power and data is networked, transmission of low power by the power source, signaling from the powered device to the power source to request high power mode, and verifying that high power is being transmitted.

One benefit is that the power transmission system and method safely transmits more than 13 watts of power (up to 200 watts in one embodiment) to devices that require more than 13 watts. Another benefit is that the power transmission system and method will not damage devices that are not capable of receiving power and data over the networking cable. Another benefit is that the power transmission system and method will not damage devices that only support reception of 13 watts of power.

DETAILED DESCRIPTION OF THE FIGURES

Figure 1:
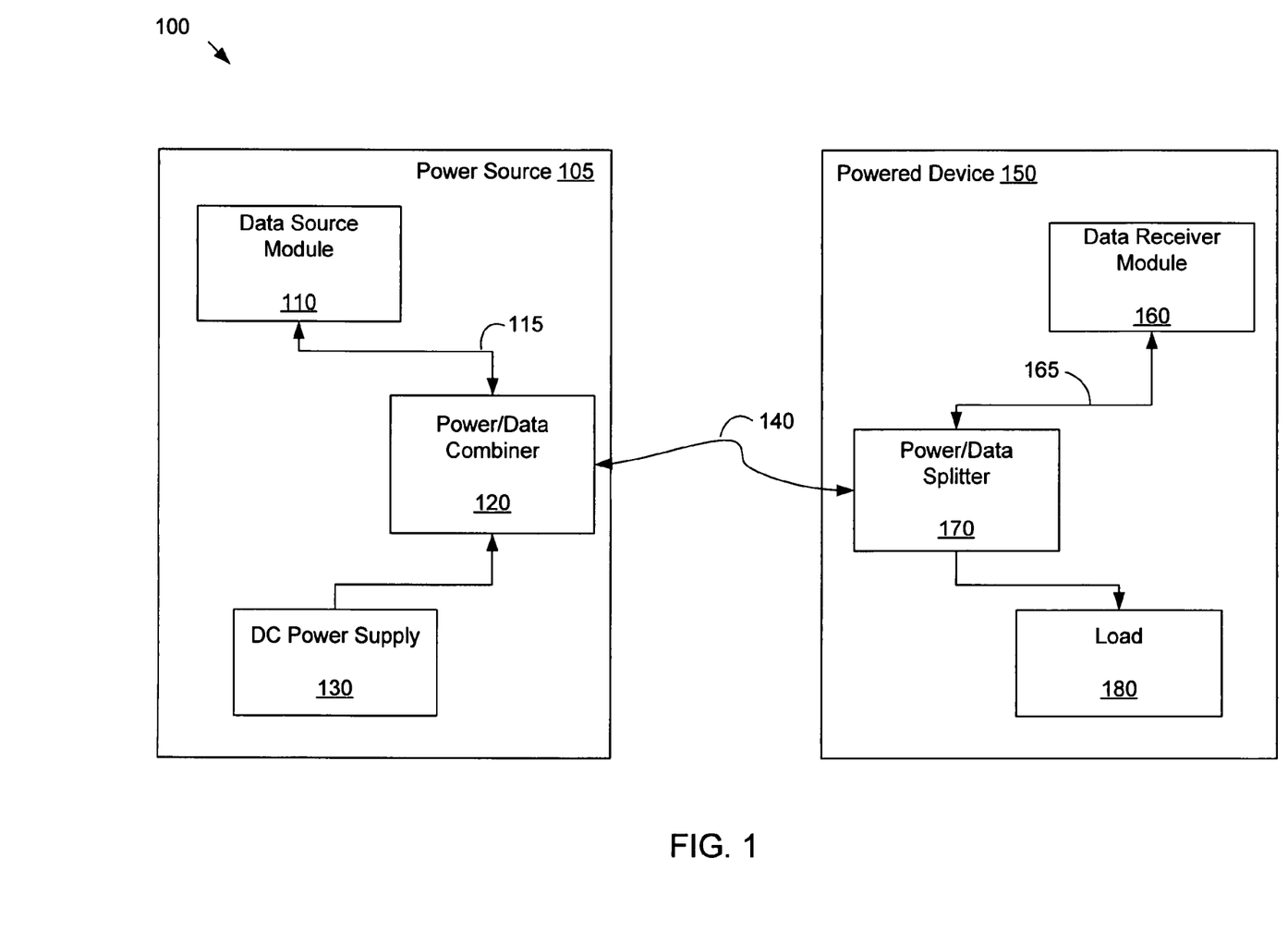
FIG. 1 illustrates an exemplary Power Delivery over Data Wiring (PDDW) system, in one embodiment of the invention.

FIG. 1 shows an exemplary Power Delivery over Data Wiring (PDDW) system 100 in one embodiment of the invention. The PDDW system 100 includes a power source 105, a powered device 150, and a networking cable 140 for delivering both power and data from the power source 105 to the powered device 150. The networking cable 140 also delivers data from the powered device 150 to the power source 105. Although data on the networking cable 140 flows bidirectionally between the power source 105 and the powered device 150, the remainder of the application will refer to power and data sent unidirectionally from the power source 105 to the powered device 150. The power source 105 includes a power/data combiner 120 configured to combine DC power received from a DC power supply 130 with data 115 received from a data source module 110 to produce a power/data signal. The power/data signal includes DC power and data 115 components for transmission over the networking cable 140. In an embodiment for power over Ethernet (POE), the networking cable 140 carries the power/data signal over four twisted-wire pairs. The powered device 150 includes a power/data splitter 170 that separates DC power and received data 165 from the power/data signal. In one embodiment, load 180 includes DC—DC converters for supplying different DC voltage levels within powered device 150.

As described in further detail below, the PDDW system 100 of one embodiment comprises passive devices having impedances for effectively combining DC power and data 115 based upon the spectral content of the data 115. In other words, the PDDW system 100 provides for "DC blocking" and "data blocking." In the power source 105, DC blocking prevents DC voltage from interfering with or damaging circuits associated with the data source module 110. Data blocking minimizes injection of the data 115 into the DC power supply 130.

Figure 2:
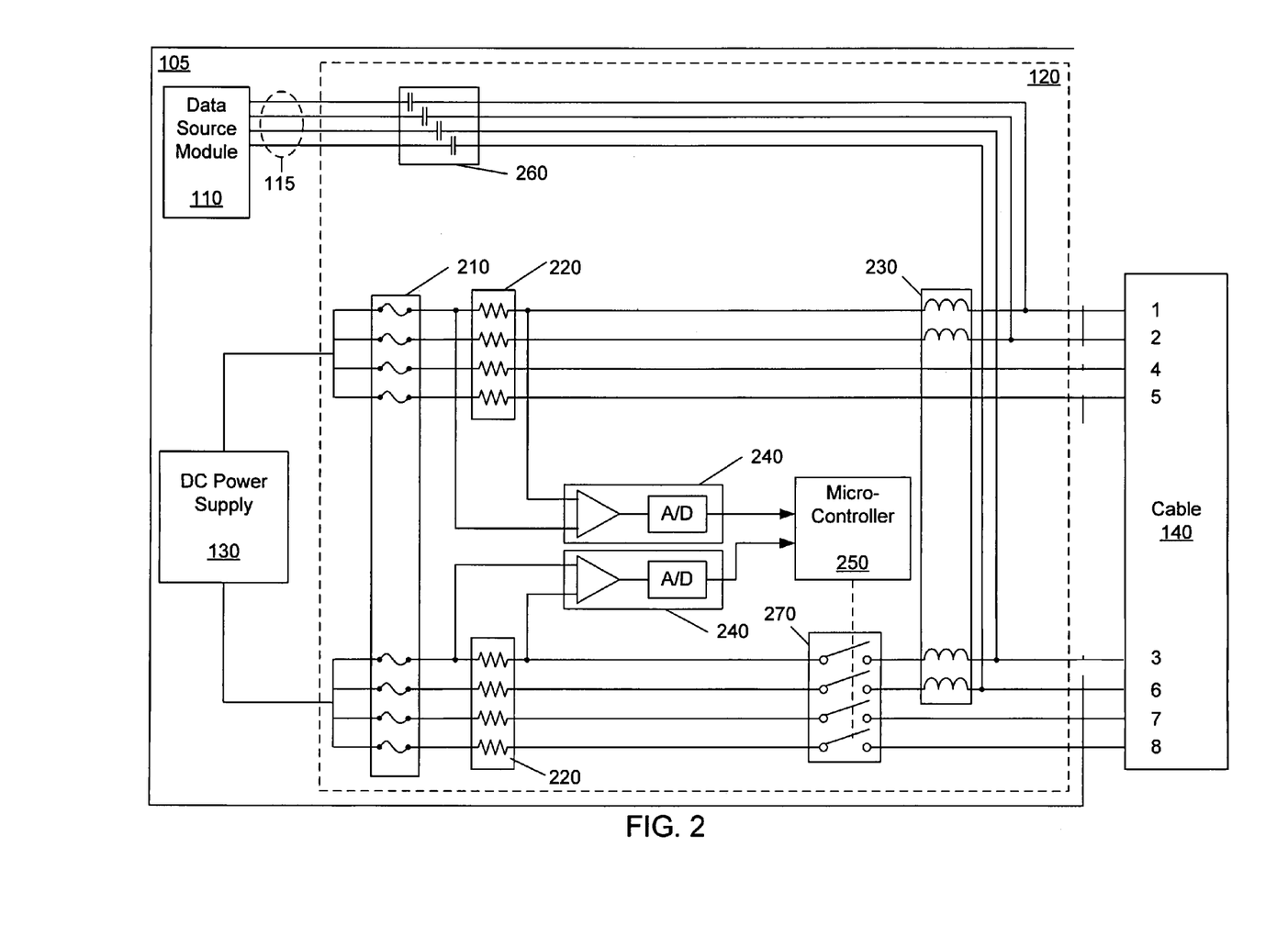
FIG. 2 illustrates a block diagram of the power source of FIG. 1, in one embodiment of the invention.

FIG. 2 illustrates a block diagram of the power source 105 of FIG. 1, in one embodiment of the invention. In one embodiment, the DC power supply 130 comprises two Class 2 power circuits (not shown) to provide DC power for transmission over the networking cable 140. To ensure safe operation, the DC power supply 130 separates and isolates the two Class 2 circuits, such that a failure in a first circuit does not affect the operation of a second circuit. The scope of the present invention covers any number of Class 2 power circuits.

In one embodiment, fuses 210 in the power source 105 provide safety in the event of a malfunction such as a short in the networking cable 140. Fuses 210 protect each powered and return wire of the networking cable 140 by insuring that a failure of the networking cable 140 cannot inadvertently overheat the networking cable 140 when excessive power is delivered over a single wire. In one embodiment, the fuses 210 are slow-blow fuses rated at 1.6 amps at 250 volts. Although FIG. 2 shows the fuses 210 as coupled to the DC power supply 130, in an alternative embodiment, the fuses 210 are coupled to a connector (not shown) for the networking cable 140 as protection against internal circuit failure in the power source 105 and/or external faults in the networking cable 140 or the powered device 150 (FIG. 1). Additional high current fuses (not shown) between the DC power supply 130 and the other circuitry in the power source 105 protect the DC power supply 130.

A microcontroller 250 can close one of a switch 270 to establish a "current loop" over a wire pair of the networking cable 140 so that the DC power supply 130 can transmit DC power to the powered device 150 (FIG. 1). A wire of the networking cable 140 is referred to as "active" when it is carrying current. Similarly, a powered wire and a return wire of the networking cable 140 establishes an active current loop. The microcontroller 250 can close additional switches 270 to establish more active current loops to transmit additional amounts of DC power from the DC power supply 130. For an Ethernet embodiment with four active current loops, wires 1, 2, 4, and 5 of the networking cable 140 comprise the powered side, and wires 3, 6, 7, and 8 comprise the return side of the four current loops. For example, in one active current loop, wire 1 of the networking cable 140 provides power, and wire 3 provides a return path.

The switches 270 may be electromechanical, or alternatively, configured as metal-oxide semiconductor field-effect transistors (MOSFET), bipolar junction transistors, equivalent circuitry, or any combination thereof. In one embodiment, MOSFET switches 270 comprise a programmable current limiting system. For example, as described below in conjunction with FIG. 8, the microcontroller 250 may program the MOSFET switches 270 to limit current to 100 milliamps for probing and testing, limit current to 1.6 amps for a "high power mode" of operation, or set no current constraints. During power-on, the microcontroller 250 can open or close each of the switches 270 independently to perform fault analysis or diagnosis on each wire (i.e., line) of the networking cable 140.

As described below in conjunction with FIG. 8, for safe operation while providing DC power and data 115 over the networking cable 140 in one embodiment, the microcontroller 250 verifies that all active wires carry similar current. Current sense resistors 220 and operational amplifier/digitizers 240 allow the microcontroller 250 to measure current on each wire of the networking cable 140. In one embodiment, the current sense resistors 220 are 50 milliohm resistors. In another embodiment, the current sense resistors 220 are copper traces rather than packaged resistors. In one embodiment, each operational amplifier/digitizer 240 includes an 8-bit A/D converter. Although FIG. 2 shows only two operational amplifier/digitizers 240, in one embodiment, eight operational amplifier/digitizers 240 measure current in the powered and return sides of each of eight wires of the networking cable 140. In one embodiment, a multiplexer circuit (not shown) receives input signals from the multiple current sense resistors 220 and transmits an output signal to a single operational amplifier/digitizer 240. The resistance of the current sense resistors 220 and amplification of the operational amplifier/digitizer 240 are selected so as to allow sensing of low current during power-up, as well as full "rail-to-rail" current sensing in high power mode.

Current sensing using the current sense resistors 220 for each wire of the networking cable 140 ensures balanced current on active current loops of the networking cable 140, as well as open circuit detection in faulty networking cables 140. For example, if the microcontroller 250 detects a current imbalance between a powered and a return wire of an active current loop, the microcontroller 250 can inhibit transmission of DC power by opening some or all of the switches 270. For safest operation in one embodiment, if the microcontroller 250 detects any faults on any active current loops, the microcontroller 250 inhibits DC power transmission.

In the power source 105, data blocking in one embodiment comprises inductors (chokes) having adequate DC current rating and sufficient inductance. Chokes 230 block data 115 generated by the data source module 110 from backward propagation into the DC power supply 130. In an embodiment for POE, only four chokes 230 are needed because only wires 1, 2, 3, and 6 carry data 115; wires 4, 5, 7, and 8 are unused for data propagation. DC blocking implemented with capacitors 260 prevents DC voltage from interfering with or damaging circuits associated with the data source module 110. The capacitors 260 have breakdown voltage ratings sufficient to block DC voltage and with sufficient capacitance to pass frequencies associated with the data 115. In one embodiment, the capacitors 260 comprise ceramic capacitors with a 200-volt voltage rating to withstand peak DC voltages. In one embodiment, capacitors 260 have capacitances of about 10 nanofarads, high enough to pass the data 115 without adding significant impedance shifts in the data 115 spectrum of interest.

Figure 3:
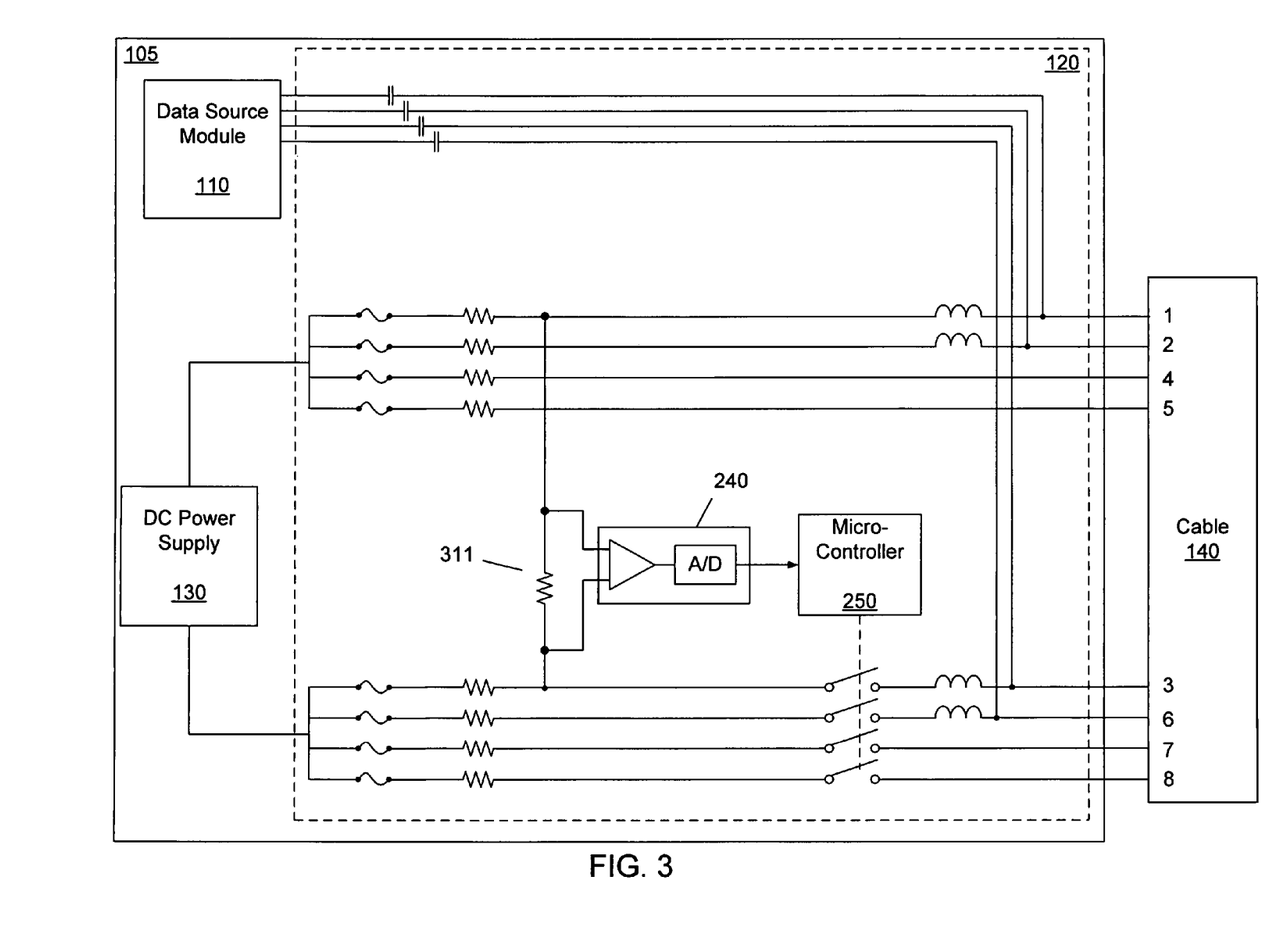
FIG. 3 illustrates a block diagram of the power source of FIG. 1, in another embodiment of the invention.

FIG. 3 illustrates a block diagram of the power source 105 of FIG. 1, in another embodiment of the invention. For clarity of illustration, FIG. 3 shows only a portion of the power source 105 to illustrate voltage sensing. Voltage sensing may be accomplished utilizing a voltage sensing resistor 311 of high impedance connected across powered and return wires of each current loop of the networking cable 140, and coupled to one of the operational amplifier/digitizers 240. In one embodiment, a multiplexer circuit (not shown) receives input signals from multiple voltage sensing resistors 311 and transmits an output signal to a single operational amplifier/digitizer 240. It will be appreciated that voltage sensing accomplishes many of the same goals as current sensing as described above in conjunction with FIG. 2. For example, a short circuit in the networking cable 140 will result in negligible voltage measured across the voltage sensing resistor 311.

Figure 4:
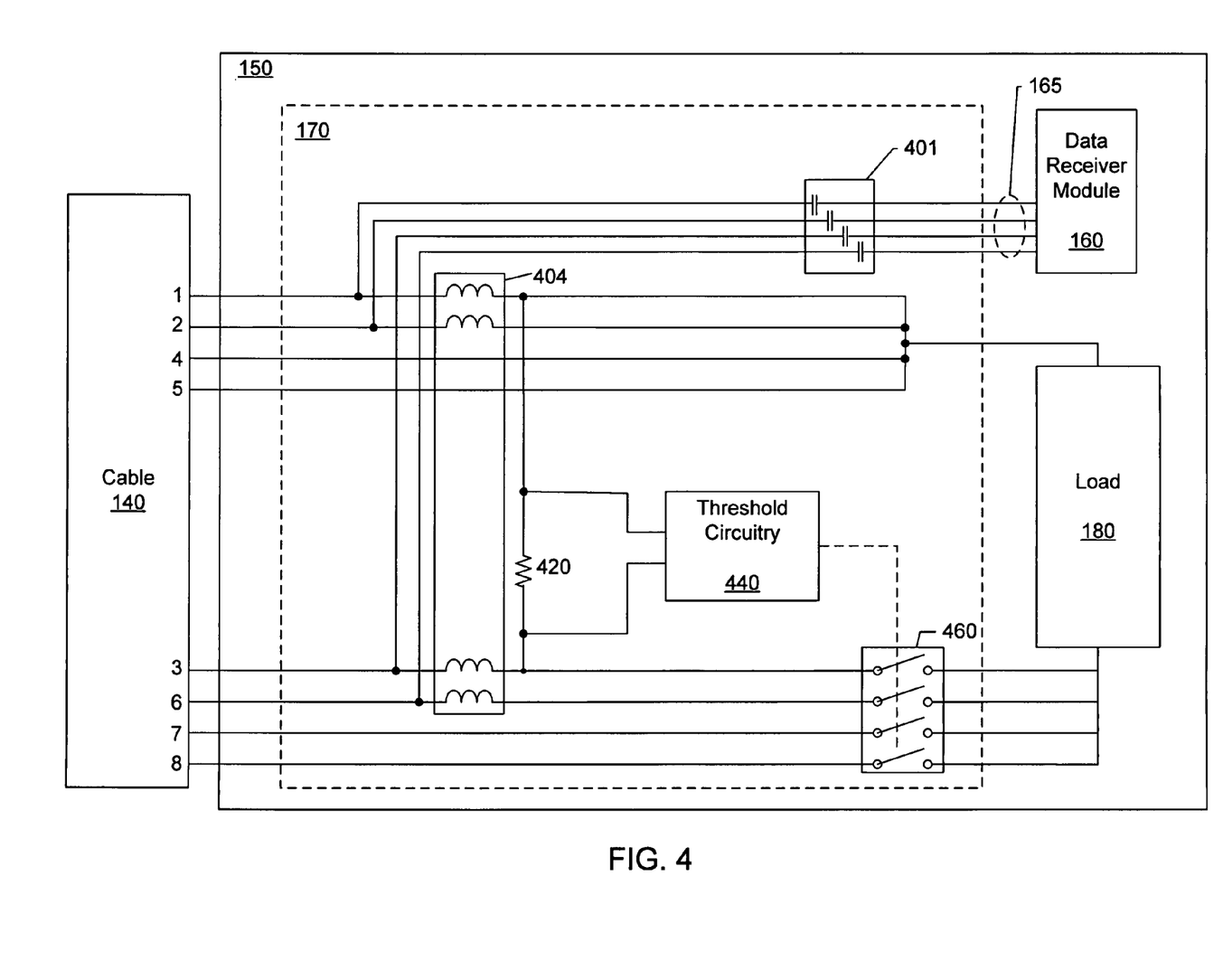
FIG. 4 illustrates a block diagram of the powered device of FIG. 1, in one embodiment of the invention.

FIG. 4 illustrates a block diagram of the powered device 150 of FIG. 1, in one embodiment of the invention. In the powered device 150, the power/data splitter 170 separates DC power and received data 165 from a power/data signal received over the networking cable 140. Low resistance, high current chokes 404 of sufficient inductance prevent received data 165 from interfering with DC power supplied to the load 180. In one embodiment, chokes 404 are 15 microhenries. In addition, DC blocking capacitors 401 in the power/data splitter 170 block DC power received over the networking cable 140 from interfering with or damaging components associated with the data receiver module 160. In one embodiment, the DC blocking capacitors 401 are 6.8 nanofarad.

Although only one signature resistor 420 is shown in FIG. 4, in one embodiment, four signature resistors 420 are provided over the powered and return wires of each of the four current loops of the networking cable 140 (i.e., between wires 1 and 3, 2 and 6, 4 and 7, and 5 and 8). As will be described in more detail below, the powered device 150 provides a non-complex 25 kilohm signature resistance through signature resistor 420 when switches 460 are open. In one embodiment, switches 460 are opto-isolated switches. In one embodiment, threshold circuitry 440 prevents activation of the switches 460 if voltages measured across powered and return wires of the networking cable 140 (i.e., across signature resistors 420) are less than 33 VDC, such that power is not delivered to the load 180.

Figure 5:
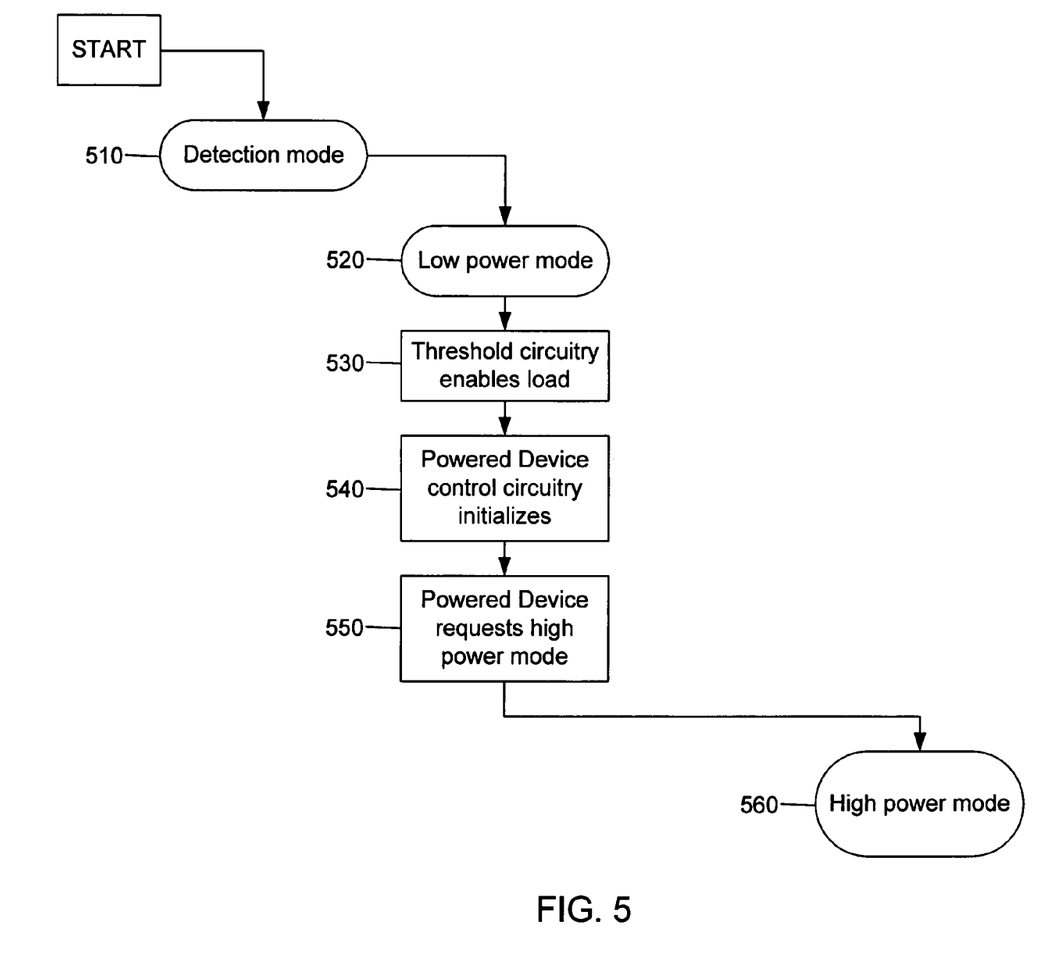
FIG. 5 illustrates a flow diagram of three sequential modes of operation for the power source and the powered device of the PDDW system of FIG. 1, in one embodiment of the invention.

FIG. 5 illustrates a flow diagram of three sequential modes of operation for the power source 105 and the powered device 150 of the PDDW system of FIG. 1, in one embodiment. In step 510, the power source 105 enters a "detection mode." In the detection mode, the power source 105 applies a low voltage over the networking cable 140 to detect whether the powered device 150 capable of receiving power and data is connected (i.e., networked) to the networking cable 140 before transmitting DC power from the DC power supply 130 onto the networking cable 140. When operating in the detection mode, the power source 105 transmits about 4 (four) milliwatts of power over the networking cable 140.

In one embodiment, the power source 105 initiates the detection mode by transmitting a low voltage and low current digital waveform over wires of the networking cable 140 carrying the data 115 (e.g., wires 1, 2, 3, and 6). In another embodiment, the power source 105 initiates the detection mode by transmitting a low voltage and low current digital waveform over both data wires (e.g., wires 1, 2, 3, and 6) and unused wires (e.g., wires 4, 5, 7, and 8) of the networking cable 140. The microcontroller 250 (FIG. 2) modulates the switches 270 (FIG. 2) in a pattern that produces the digital waveform. In one embodiment, the DC power supply 130 applies a detection voltage of 2.8–10 volts DC, and the microcontroller 250 detects whether the 25 kilohm signature resistance of the signature resistor 420 (FIG. 4) is present in each of the four current loops. In detection mode, the DC voltage from the power source 105 is less than 33 VDC, so the threshold circuitry 440 (FIG. 4) prevents the load 180 (FIG. 4) from presenting a complex load to the power source 105. If the microcontroller 250 does not detect the 25 kilohm signature resistance, then the microcontroller 250 remains in detection mode and does not activate either the low power mode or the high power mode. This prevents the transmission of DC power to any device that is not capable of receiving power in either the low power mode or the high power mode.

At step 520, after the power source 105 detects a valid signature resistance from the powered device 150, the PDDW system 100 enters a low power mode and microcontroller 250 applies power to unused wires of the networking cable 140. The low power mode delivers any amount of power less than the amount of power delivered in a high power mode. In the low power mode of one embodiment, the power source 105 transmits a total of about 20 watts of DC power distributed over two active current loops of networking cable 140. Powered wires 4 and 5 of the networking cable 140 provide up to about 20 watts of power (i.e., up to 55 VDC at 350 milliamps), with wires 7 and 8 providing return paths. At step 530, in low power mode, threshold circuitry 440 in powered device 150 senses that DC voltage across the signature resistor 420 exceeds 33 VDC. The threshold circuitry 440 closes switches 460 (FIG. 4) to supply power to the load 180 in the powered device 150. At step 540, control circuitry in the powered device 150 initializes and prepares for high power mode.

At step 550, after control circuitry in the powered device 150 initializes, powered device 150 signals the power source 105 to request the high power mode. At step 560, the power source 105 enters the high power mode. In the high power mode, power source 105 delivers any amount of power more than the amount of power delivered in the low power mode. In the high power mode of one embodiment, the power source 105 transmits a total of up to about 200 watts of DC power over four active current loops of the networking cable 140.

Figure 6:
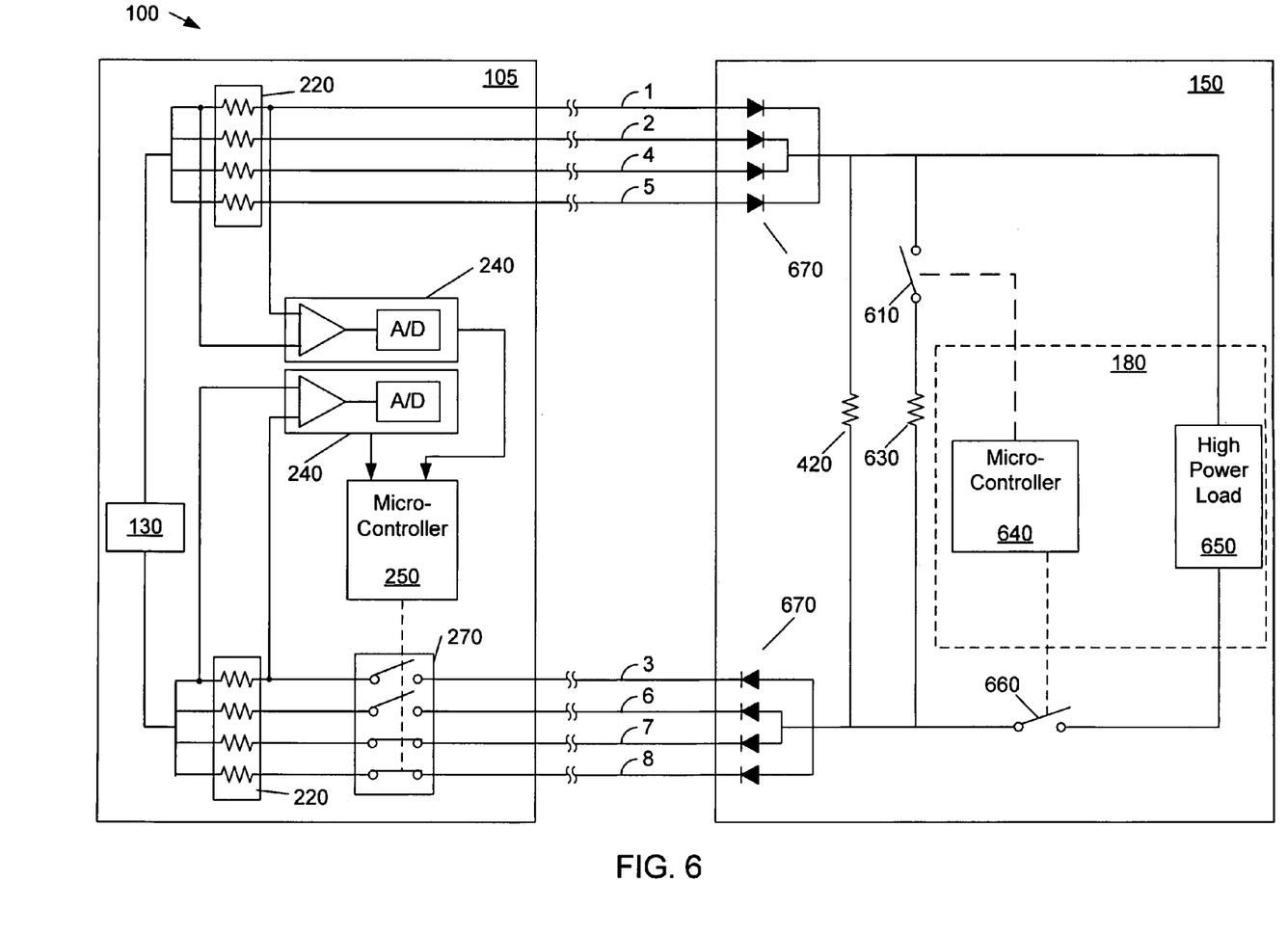
FIG. 6 illustrates an exemplary block diagram of the PDDW system of FIG. 1 configured for requesting high power operation via current-mode signaling, according to one embodiment of the invention.
Figure 7:
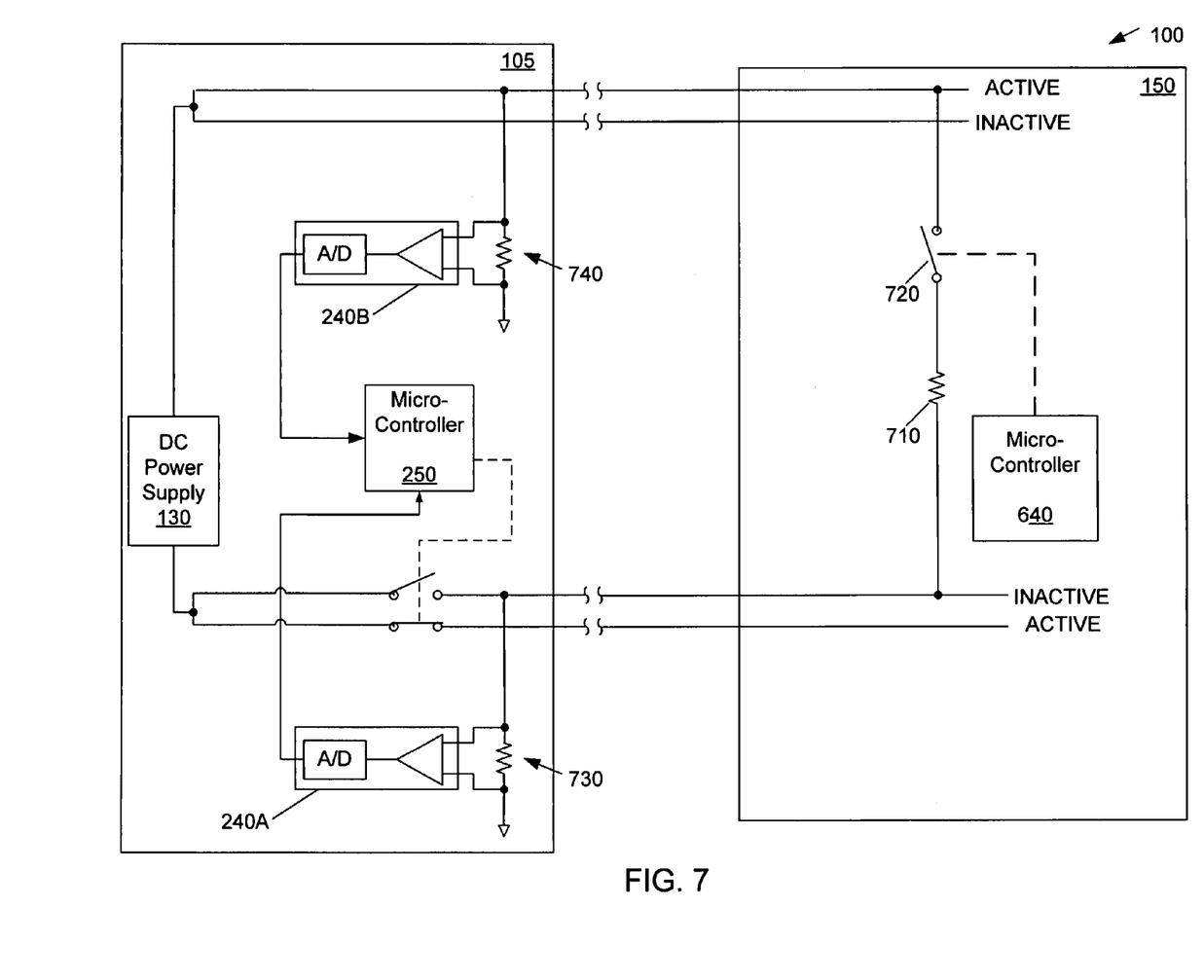
FIG. 7 illustrates an exemplary block diagram of the PDDW system of FIG. 1 configured for requesting high power operation via voltage-mode signaling, according to one embodiment of the invention.

To support high power operation, FIGS. 6 and 7 illustrate exemplary communication procedures for signaling from the powered device 150 to the power source 105 to request the high power mode. A first method of "current-mode signaling" transmits a digital waveform by modulating a current over active current loops. A second method of "voltage mode signaling" transmits a digital waveform by switching DC voltage between the powered side of an active current loop and the return side of an inactive current loop. Because of signaling between the powered device 150 and the power source 105, the present invention is configured to deliver power at any number of power levels, and to deliver power at one or more specific levels.

FIG. 6 illustrates an exemplary block diagram of the PDDW system 100 of FIG. 1 configured for requesting high power operation via current-mode signaling, according to one embodiment of the invention. For clarity of illustration, only a portion of the power source 105 and powered device 150 is shown. In the low power mode of operation, a microcontroller 640 holds a switch 660 open so that a high power load 650 is not enabled (i.e., DC power is not supplied to the high power load 650). The microcontroller 640 initializes and requests high power mode of operation from power source 105 by toggling switch 610 at a specific frequency, or in a specific pattern. In one embodiment, the microcontroller 640 toggles the switch 610 at a low bit rate. In another embodiment, the microcontroller 640 modulates a high frequency carrier on the networking cable 140 (FIG. 1), such that if DC/DC converters (not shown) in the high power load 650 are enabled, the power source 105 will be immune to load changes and switching power supply noise. In another embodiment, the microcontroller 640 toggles the switch 610 or modulates a high frequency carrier on the networking cable 140 to communicate a request for power of a specific level to the power source 105.

Because of the toggling of the switch 610, current flowing over active current loops cycles between two levels. Signature resistor 420 governs a first current level when the switch 610 is open. When the switch 610 is closed, signature resistor 420 in parallel with signaling resistor 630 determines a second current level. The signaling resistor 630 draws sufficient current to be detectable at the power source 105. In one embodiment, signaling resistor 630 is 1.2-kilohms because the microcontroller 250 of the power source 105 senses current over a range of zero to about two amps. A 1.2-kilohm load at 34 volts is about 28 milliamps or 1.4% of the current range. The powered device 150 cycles current on active wires of the networking cable 140 that are not used for carrying data 115, for example, on lines 7 and 8. Because of the current draw of the powered device 150 cycling between two levels, the microcontroller 250 in the power source 105 determines that the powered device 150 is requesting high power mode via current sense resistors 220. In one embodiment, the powered device 150 comprises steering diodes 670 to ensure isolation between active current loops, and to prevent damage in case of reverse polarity on the networking cable 140.

In one embodiment, once the power source 105 enters high power mode, DC power is delivered from the power source 105 to the powered device 150 overall four current loops of the networking cable 140. The powered device 150 senses DC voltage on all four current loops of the networking cable 140, and then closes the switch 660 so that high power load 650 receives DC power. In one embodiment, 55VDC at 0.91 amps is applied to each of the four current loops, for a total of 200 watts.

FIG. 7 illustrates an exemplary block diagram of the PDDW system 100 of FIG. 1 configured for requesting high power operation via voltage-mode signaling, according to one embodiment of the invention. For clarity of illustration, only a portion of the power source 105 and the powered device 150 is shown. A negative sense resistor 730 and an operational amplifier/digitizer 240A allow the microcontroller 250 to measure voltage across a return wire (e.g., wires 3, 6, 7, and 8) of each current loop. A positive sense resistor 740 and an operational amplifier/digitizer 240B allow the microcontroller 250 to measure voltage across a positive wire (e.g., wires 1, 2, 4, and 5) of each current loop. Although only one negative sense resistor 730 and one positive sense resistor 740 are illustrated in FIG. 7, four negative sense resistors 730 and four positive sense resistors 740 are provided in one embodiment.

The powered device 150 includes a pull-up resistor 710 and an opto-isolated switch 720. While in low power mode, the microcontroller 640 of the powered device 150 switches DC voltage from an active positive wire onto one or more inactive return wires by closing the switch 720. When switch 720 is closed, a DC voltage is applied to the return wire via the pull-up resistor 710. The switched DC voltage is sensed in the power source 105 by the sense resistor 730, the operational amplifier/digitizer 240A, and the microcontroller 250. The microcontroller 250 of the power source 105 detects changes in voltage on the previously inactive return wire, indicating that the powered device 150 is identifying itself and requesting high power mode.

Figure 8:
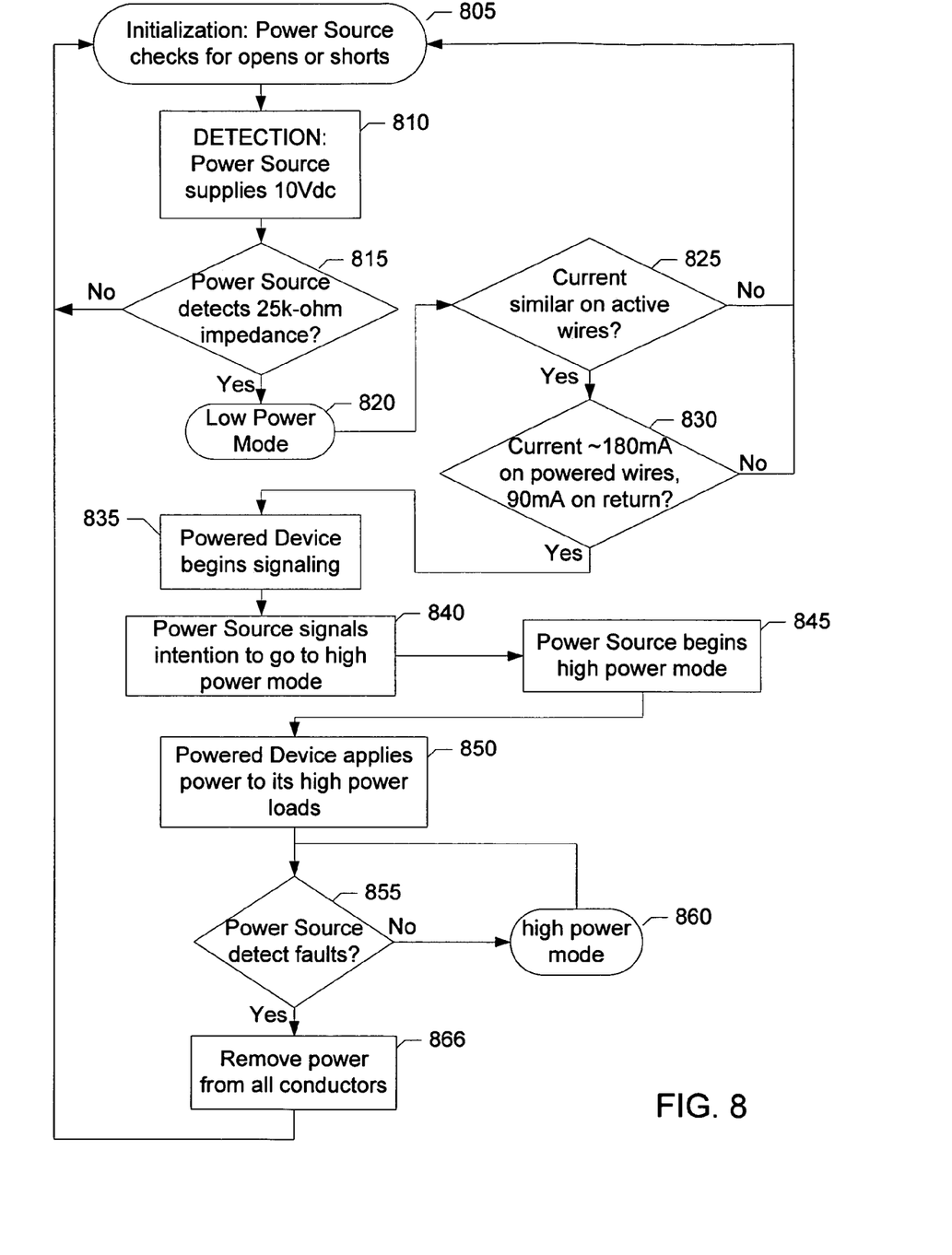
FIG. 8 illustrates an exemplary method for signaling requests for power between the power source and the powered device of FIG. 1, in one embodiment of the invention.

FIG. 8 illustrates an exemplary method for signaling requests for power between the power source 105 and the powered device 150 of the PDDW system 100 of FIG. 1, in one embodiment of the invention. In step 805, the microcontroller 250 (FIG. 2) checks for shorts on each wire of the networking cable 140 (FIG. 1). In one embodiment, 47-kilohm resistors (not shown) across the current loops (i.e., across wires 1 and 3, 2 and 6, 4 and 7, and 5 and 8) in the powered device 150 allow the microcontroller 250 to check for short circuits. For example, the microcontroller 250 injects a small amount of current onto each of wires 8, 7, 6, and 3 one at a time, and then the microcontroller 250 checks that no short is present to any of wires 1, 2, 4, or 5. In step 810, the power source 105 powers the networking cable 140 with a low voltage and low current to detect the presence of the powered device 150 capable of receiving power and data. In step 815, the powered device 150 capable of receiving power and data is present in the PDDW system 100 if the power source 105 detects a 25-kilohm impedance with a detection voltage of less than 10 volts DC.

In step 820, in one embodiment, low power mode is entered and DC power is delivered over powered wires 4 and 5, with return on wires 7 and 8 of the networking cable 140. Pass transistors (not shown) coupled to wires 7 and 8 of the networking cable 140 are powered with 1.6 amp current limiting in effect to limit inrush current. Pass transistors enable a power supply to pass current while voltage is kept constant. At step 825, the current sensing should indicate similar currents on the powered wire and the return wire of active current loops. If current on the powered wire or the return wire of any active current loop indicates an open circuit or short circuit, a transition will be made to the initialization state.

At step 830, in the low power mode of a POE embodiment, the powered device 150 preferably draws less than 180 milliamps per power-switched conductor and less than 90 milliamps per return conductor. The maximum current for 13 watts under the IEEE specifications is 180 milliamps on each of two powered wires of the networking cable 140, for a total current of 360 milliamps. On each of the four return wires of the networking cable 140, the return current of 360 milliamps is shared, equating to 90 milliamps per return wire of the networking cable 140. If only two of the return wires carry current as in IEEE802.3af, each should carry less than 180 milliamps. If current sensing indicates current outside of acceptable limits, the power source 105 returns to the initialization state. If current goes to zero indicating disconnection of the networking cable 140, the power source 105 returns to the initialization state.

At step 835, the powered device 150 signals the power source 105 by modulating current on wires 7 and 8 of the networking cable 140 with a switched resistive current shunt (about 1200 ohms) or by applying a switched resistor-limited voltage to the return side of an inactive current loop. The power source 105 interprets the signaling as a bit stream informing the power source 105 that the powered device 150 is a high power device requesting up to 200 W of power over all four current loops. In one embodiment, the powered device 150 signals the power source 105 to request a specific amount of power. At step 840, the power source 105 responds to the powered device 150 signaling by transmitting an on/off pattern of switch closures on wires 7 and 8. The powered device 150 receives signaling from the power source 105 on twisted-wire pair 7–8. The powered device 150 interprets the signaling as an indication that the power source 105 may provide power over all four twisted-wire pairs of the networking cable 140. In one embodiment, the powered device 150 interprets the signaling as an indication that the power source 105 may provide a specific amount of power. The powered device 150 detects the signaling using the same circuitry it uses to determine that power is being applied to all four current loops. At step 845, the power source 105 initiates high power mode.

At step 850, the powered device 150 senses voltage on all four current loops and applies power to the high power load 650 (FIG. 6). At step 855, the power source 105 detects faults by examination of current on all four current loops. If the power source 105 determines that any powered wire or return wire of the networking cable 140 indicates excessive current, low or unbalanced current, or no current, then at step 866, the power source 105 enters a fault state. In one embodiment, short circuits of more than three amps on a wire result in immediate removal of power from all pass transistors. In another embodiment, over-current in excess of 1.6 amps average per wire for longer than 5 seconds will result in a current limit condition which can persist only if the pass transistors remain inside their safe operating area (SOA). Open circuits are detected when no current is being drawn. The fault state consequential to open circuits or short circuits will result in removal of power from all wire until the fault is removed. Otherwise, at step 860, the power source 105 will remain in high power mode. If at step 866, current goes to zero on all wires indicating removal of the networking cable 140, the power source 105 returns to the initialization state.

Several goals are achieved with the present invention. First, the system operates within the safe electrical low voltage (SELV) region with voltages less than 60 volts DC. Second, the system provides multiple powering modes. Devices that are not equipped to receive DC power via the networking cable 140 (FIG. 1) receive data as normally. The PDDW system 100 (FIG. 1) does not damage devices that are unable to communicate or are unaware of low or high power mode operation. The low power mode is only entered upon the power source 105 (FIG. 1) recognizing an identified powered device 150 (FIG. 1). High power is delivered only to those devices that are properly identified and that request high power.

The present invention has been described above with reference to specific embodiments. However, it will be apparent to one skilled in the art that various modifications may be made and other embodiments can be used without departing from the broader scope of the present invention. For example, although the present invention has been described in terms of contemporary cables using four pairs of twisted-wire, one can readily envision schemes with higher power sent over a greater number of conductors (e.g., in structured cables containing multiple (e.g., more than four) twisted pairs). Further, a skilled artisan could readily identify additional power modes or even the transmission of AC power delivery with appropriate filtering.

What is claimed is:

1. A power and data delivery system comprising:
   a networking cable comprising at least one wire pair;
   a power source coupled to the networking cable, the power source configured to transmit data and power of at least two power levels over the networking cable;
   a powered device coupled to the networking cable, the powered device configured to receive the data and the power;
   wherein the power of the at least two power levels comprises a low power level and a high power level; and
   the powered device requests power of the high power level by sending a signal to the power source over the networking cable.

2. The power and data delivery system of claim 1 wherein the power source is further configured to transmit power of the low power level over two or more wire pairs of the networking cable.

3. The power and data delivery system of claim 1 wherein the power source is further configured to transmit power of the high power level over at least four wire pairs of the networking cable.

4. The power and data delivery system of claim 1 wherein the signal is produced by modulating a current drawn by the powered device.

5. The power and data delivery system of claim 1 wherein the signal is produced by switching a voltage between active and inactive wires of the networking cable.

6. The power and data delivery system of claim 1 wherein transmission of the signal is terminated upon the powered device detecting voltage over four wire pairs of the networking cable.

7. The power and data delivery system of claim 1 wherein transmission of the signal is terminated upon the powered device detecting voltage over four wire pairs of the networking cable and a signaling response being received by the power source.

8. The power and data delivery system of claim 1 wherein the power source comprises current sensing means for performing current sensing on four or more wire pairs of the networking cable.

9. The power and data delivery system of claim 1, wherein the powered device is further configured to transmit data to the power source; and the power source is further configured to receive data from the powered device.

10. A method for transmitting power and data over a networking cable, comprising the steps of:
    detecting whether a device capable of receiving power and data is networked;
    if the device capable of receiving power and data is networked, transmitting power at a low power level over the networking cable; and
    signaling from the device to request power at a high power level.

11. The method of claim 10 wherein the step of transmitting power at a low power level is performed using two or more wire pairs of the networking cable.

12. The method of claim 10 wherein the step of signaling is performed by modulating a current drawn by the device.

13. The method of claim 10 wherein the step of signaling is performed by switching a voltage between active and inactive wires of the networking cable.

14. The method of claim 10 wherein the step of signaling is terminated upon the device detecting voltage over four wire pairs of the networking cable.

15. The method of claim 10 wherein the step of signaling is terminated upon the device detecting voltage over four wire pairs of the networking cable and a signaling response being transmitted over the networking cable.

16. The method of claim 10, further comprising the step of verifying that the power at the high power level is being transmitted over the networking cable.

17. The method of claim 16 wherein the step of verifying that the power at the high power level is being transmitted is performed using current sensing on four or more wire pairs of the networking cable.

18. The method of claim 10, further comprising transmitting data from the device.

19. A power and data delivery system comprising:
   means for transmitting data and power of at least a low power level and a high power level to a networked device over a networking cable;
   means for separating the data and the power received from the networking cable; and
   means for signaling a request for the power of the high power level over the networking cable.

20. The system of claim 19 wherein the means for signaling further comprises means for modulating a current drawn over the networking cable.

21. The system of claim 19 wherein the means for signaling further comprises means for switching a voltage transmitted over the networking cable between active and inactive wires of the networking cable.

22. The system of claim 19 further comprising means for detecting voltage over four wire pairs of the networking cable.

23. The system of claim 19 further comprising means for detecting voltage over four wire pairs of the networking cable and means for receiving a signaling response.

24. The system of claim 19 further comprising means for current sensing on four or more wire pairs of the networking cable.

25. A system for transmitting power and data over a networking cable, comprising:
   means for detecting whether a device capable of receiving power and data is networked;
   if the device capable of receiving power and data is networked, means for transmitting low power over the networking cable; and
   means for signaling from the device to request high power.

26. The system of claim 25 wherein the means for signaling further comprises means for modulating a current drawn by the device.

27. The system of claim 25 wherein the means for signaling further comprises means for switching a voltage between active and inactive wires of the networking cable.

28. A power source comprising:
   a DC power supply configured to supply power of at least two power modes;
   a data source configured to supply data;
   a power/data combiner configured to combine the power and the data for transmission over a networking cable; and
   wherein the power/data combiner is further configured to detect a powered device being connected to the networking cable.

29. The power source of claim 28 wherein the at least two power modes comprise a low power mode and a high power mode.

30. The power source of claim 29 wherein the power/data combiner is further configured to transmit the low power mode over two or more wire pairs of the networking cable.

31. The power source of claim 29 wherein the power/data combiner is further configured to transmit the high power mode over at least four wire pairs of the networking cable.

32. The power source of claim 28, wherein the data source is further configured to receive data.

33. The power source of claim 28 wherein the power source further comprises current sensing means for performing current sensing on four or more wire pairs of the networking cable.

34. A powered device comprising:
   a power/data splitter configured to separate data and power of at least two power modes received over a networking cable;
   a data receiver module configured to receive the data; and
   wherein the powered device requests a high power mode by sending a signal to a power source of the networking cable.

35. The powered device of claim 34 wherein the powered device is configured to generate the signal by modulating a current drawn by the powered device.

36. The powered device of claim 34 wherein the powered device is configured to generate the signal by switching a voltage between active and inactive wires of the networking cable.

37. The powered device of claim 34 wherein transmission of the signal is terminated upon the powered device detecting voltage over four wire pairs of the networking cable.

38. The powered device of claim 34, wherein the data receiver module is further configured to transmit data over the networking cable.

* * * * *